United States Patent
Lo et al.

(10) Patent No.: US 10,522,098 B2
(45) Date of Patent: Dec. 31, 2019

(54) REFLECTIVE COLOR ELECTROPHORESIS DISPLAY DEVICE

(71) Applicant: E Ink Holdings Inc., Hsinchu (TW)

(72) Inventors: Po-Yuan Lo, Hsinchu (TW); Tai-Yuan Lee, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/239,561

(22) Filed: Jan. 4, 2019

(65) Prior Publication Data
US 2019/0228715 A1 Jul. 25, 2019

(30) Foreign Application Priority Data
Jan. 22, 2018 (TW) ............................. 107102239 A

(51) Int. Cl.
*G09G 3/34* (2006.01)
*G02F 1/167* (2019.01)

(52) U.S. Cl.
CPC .............. *G09G 3/344* (2013.01); *G02F 1/167* (2013.01)

(58) Field of Classification Search
CPC .. G02F 1/13394; G02F 1/167; H01L 27/3211; H01L 51/0005; G09G 3/344
See application file for complete search history.

(56) References Cited

U.S. PATENT DOCUMENTS

| | | |
|---|---|---|
| 6,903,719 B2 | 6/2005 | Richley |
| 2003/0090597 A1 | 5/2003 | Katoh et al. |
| 2008/0273132 A1* | 11/2008 | Hsu ......................... G02F 1/167 349/39 |
| 2010/0157411 A1* | 6/2010 | Kwon ...................... G02F 1/167 359/296 |
| 2011/0222016 A1* | 9/2011 | Kaneko ............... G02F 1/13394 349/155 |
| 2012/0236416 A1* | 9/2012 | Sugahara ............... G02B 3/005 359/619 |
| 2013/0163067 A1* | 6/2013 | Kim ........................ G02F 1/167 359/296 |
| 2015/0138161 A1 | 5/2015 | Wassvik |
| 2015/0301424 A1* | 10/2015 | Lo ........................... G02F 1/167 345/107 |

(Continued)

FOREIGN PATENT DOCUMENTS

| | | |
|---|---|---|
| JP | 2007271741 A | 10/2007 |
| WO | 1997033267 A2 | 9/1997 |
| WO | 1997050071 A1 | 12/1997 |

OTHER PUBLICATIONS

Corresponding Taiwan office action dated Apr. 23, 2019.

*Primary Examiner* — Gerald Johnson
(74) *Attorney, Agent, or Firm* — CKC & Partners Co., LLC

(57) ABSTRACT

A reflective color electrophoresis display device includes a plurality of sub-pixel structures, and each of the sub-pixel structures includes a columnar body, an electronic ink layer, two electrodes and a rotation control unit. The columnar body includes at least one spacer radially disposed to divide the columnar body into at least two portions. The electronic ink layer is disposed over one of the at least two portions of the columnar body, and the electronic ink layer contains two different color particles. The two electrodes electrically connect the electronic ink layer to control movement of the two different color particles. The rotation control unit is configured to control rotation of the columnar body.

11 Claims, 4 Drawing Sheets

(56) References Cited

U.S. PATENT DOCUMENTS

2016/0148981 A1     5/2016  Matsueda
2016/0216590 A1*    7/2016  Kimura .................. G09G 3/344
2018/0188596 A1*    7/2018  Lo ..................... G02F 1/133514
2019/0081110 A1*    3/2019  Sonoda .................... G02B 5/30

* cited by examiner

REFLECTIVE COLOR ELECTROPHORESIS DISPLAY DEVICE

CROSS-REFERENCE TO RELATED APPLICATION

This application claims priority to Taiwan Application Serial Number 107102239, filed Jan. 22, 2018, which is herein incorporated by reference.

BACKGROUND

Field of Invention

The present disclosure relates to a reflective color electrophoresis display device.

Description of Related Art

Conventional reflective color electrophoresis display device displays color by driving thin film transistors. However, small sub-pixel structure results in poor color performance. The size of the sub-pixel structure can be increased to reflect more light and thus to provide better color performance. However, the size of the sub-pixel structure is limited by resolution and thus cannot be infinitely enlarged, thereby limiting the color performance.

SUMMARY

A purpose of the present disclosure is to provide a reflective color electrophoresis display device, which includes a plurality of sub-pixel structures, and each of the sub-pixel structures includes a columnar body, an electronic ink layer, two electrodes and a rotation control unit. The rotation control unit controls rotation of the columnar body, and the two electrodes drive and control display color of the electronic ink layer, thereby controlling display color of the sub-pixel structure. Such method that size of the display region is controlled by mechanical and electrode driving can maintain resolution of the display device and improve color performance.

The present disclosure provides a reflective color electrophoresis display device, which includes a plurality of sub-pixel structures, and each of the sub-pixel structures includes a columnar body, an electronic ink layer, two electrodes and a rotation control unit. The columnar body includes at least one spacer radially disposed to divide the columnar body into at least two portions. The electronic ink layer is disposed over one of the at least two portions of the columnar body, and the electronic ink layer contains two different color particles. The two electrodes electrically connect the electronic ink layer to control movement of the two different color particles. The rotation control unit is configured to control rotation of the columnar body.

According to some embodiments of the present disclosure, the two electrodes are an upper electrode and a lower electrode, and the upper electrode is in contact with an upper surface of the electronic ink layer, and the lower electrode is in contact with a lower surface of the electronic ink layer and between the electronic ink layer and the one of the at least two portions of the columnar body.

According to some embodiments of the present disclosure, the sub-pixel structure further includes an insulating layer adjacent to the electronic ink layer.

According to some embodiments of the present disclosure, the rotation control unit includes a shaft disposed in the columnar body; and a first signal line electrically connecting the shaft to control the rotation of the columnar body.

According to some embodiments of the present disclosure, the sub-pixel structure further includes: a second signal line and a third signal line electrically connecting the two electrodes, respectively.

According to some embodiments of the present disclosure, one of the second signal line and the third signal line is disposed over the spacer.

According to some embodiments of the present disclosure, the sub-pixel structure has a diameter in a range of 5 mm to 500 mm.

According to some embodiments of the present disclosure, the columnar body includes three spacers to divide the columnar body into three portions.

According to some embodiments of the present disclosure, the sub-pixel structures further includes a reflective coating layer disposed over the other of the at least two portions of the columnar body.

According to some embodiments of the present disclosure, colors of the two different color particles are selected from the group consisting of red, green, blue, white, cyan, magenta, yellow and black.

According to some embodiments of the present disclosure, colors of the two different color particles are black and white, respectively, and the sub-pixel structure further includes a color filter disposed over the upper electrode.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
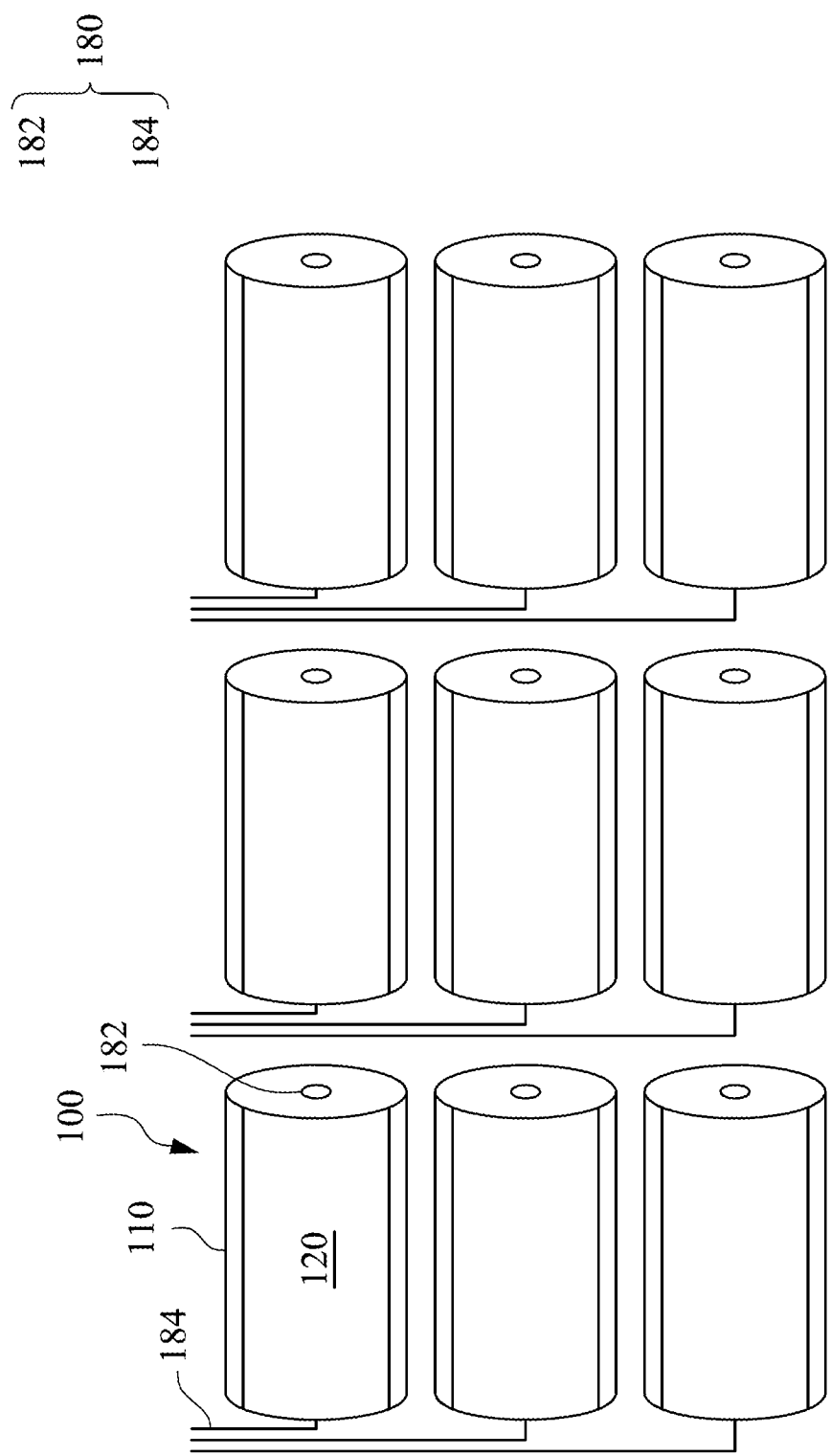
FIG. 1 is a top view of a reflective color electrophoresis display device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A purpose of the present disclosure is to provide a reflective color electrophoresis display device, which includes a plurality of sub-pixel structures, and each of the sub-pixel structures includes a columnar body, an electronic ink layer, two electrodes and a rotation control unit. The rotation control unit controls rotation of the columnar body, and the two electrodes drive and control display color of the electronic ink layer, thereby controlling display color of the sub-pixel structure. Such method that size of the display region is controlled by mechanical and electrode driving can maintain resolution of the display device and improve color performance.

FIG. 1 is a top view of a reflective color electrophoresis display device according to some embodiments of the present disclosure. As shown in FIG. 1, the reflective color electrophoresis display device includes a plurality of sub-pixel structures 100. The plurality of sub-pixel structures 100 can be arranged in a pixel array.

Figure 2:
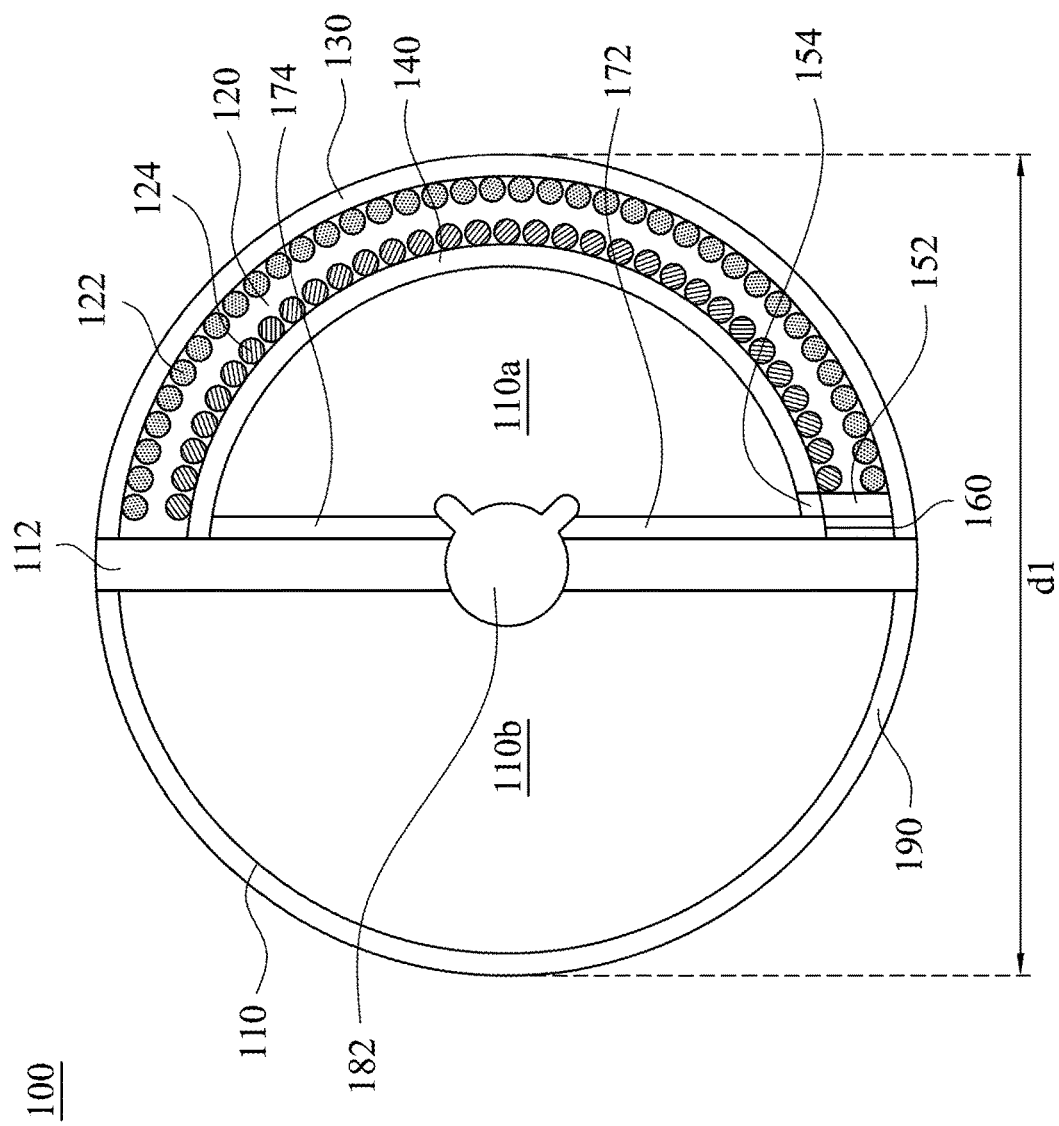
FIG. 2 is a cross-sectional view of a reflective color electrophoresis display device according to some embodiments of the present disclosure.

FIG. 2 is a cross-sectional view of a reflective color electrophoresis display device according to some embodiments of the present disclosure. Referring to FIGS. 1 and 2, the sub-pixel structure 100 includes a columnar body 110, an electronic ink layer 120, two electrodes 130, 140 and a rotation control unit 180. In some embodiments, as shown in FIG. 2, the sub-pixel structure 100 has a diameter d1 in a range of 5 mm to 500 mm. The diameter d1 of the sub-pixel structure 100 may be determined according to actual application of the reflective color electrophoresis display device, such as a personal display device or an advertisement board.

As shown in FIG. 2, the columnar body 110 includes at least one spacer 112 radially disposed to divide the columnar body 110 into at least two portions 110a, 110b. In some embodiments, the columnar body 110 includes two spacers 112 radially disposed to divide the columnar body 110 into two portions 110a, 110b. In some embodiments, the spacer 112 includes insulating material or other suitable material. Radii of the plurality portions divided by the spacer(s) 112 may be same or different. In some embodiments, as shown in FIG. 2, radii of the two portions divided by the spacer 112 are different.

The electronic ink layer 120 is disposed over one 110a of the at least two portions 110a, 110b of the columnar body 110. The electronic ink layer 120 contains two different color particles 122, 124. In some embodiments, colors of the two different color particles 122, 124 of the electronic ink layer 120 are selected from the group consisting of red, green, blue, white, cyan, magenta, yellow and black. These color particles 122, 124 carry charge.

The two electrodes 130, 140 electrically connect the electronic ink layer 120 to control movement of the two different color particles 122, 124. In some embodiments, the two electrodes 130, 140 are an upper electrode 130 and a lower electrode 140, respectively, and the electronic ink layer 120 is between the upper electrode 130 and the lower electrode 140. The upper electrode 130 is in contact with an upper surface of the electronic ink layer 120. The lower electrode 140 is in contact with a lower surface of the electronic ink layer 120 and between the electronic ink layer 120 and the one 110a of the at least two portions 110a, 110b of the columnar body 110.

As shown in FIG. 2, in some embodiments, the sub-pixel structure further includes a second signal line 172 and a third signal line 174 electrically connecting the two electrodes 130, 140, respectively. In some embodiments, one of the second signal line 172 and the third signal line 174 is disposed over the spacer 112. In some embodiments, as shown in FIG. 2, both of the second signal line 172 and the third signal line 174 are disposed over the spacer 112. In some embodiments, the second signal line 172 and the third signal line 174 are disposed along the radius of the columnar body 110. In some embodiments, different signals may be transmitted to the second signal line 172 and the third signal line 174 through signal lines in a shaft 182, and then transmitted to the upper electrode 130 and the lower electrode 140 to control electric field of the electronic ink layer 120, and thus to control movement of the charged color particles 122, 124.

As shown in FIG. 2, in some embodiments, the third signal line 174 is in direct contact with the lower electrode 140. In some embodiments, the sub-pixel structure further includes a conductor 160, such that the upper electrode 130 can be electrically connected to the second signal line 172 through the conductor 160. In some embodiments, the conductor 160 is a conductive paste or a conductive wire. In some embodiments, the conductor 160 is silver paste. In other embodiments, the second signal line 172 may be in direct contact with the upper electrode 130.

As shown in FIG. 2, in some embodiments, the sub-pixel structure 100 further includes an insulator 152 adjacent to the electronic ink layer 120. In some embodiments, the sub-pixel structure 100 further includes an insulator 154 adjacent to the lower electrode 140. The insulators 152, 154 are configured to electrically isolate the upper electrode 130, the conductor 160 and the second signal line 172 connected to each other, and the lower electrode 140. In other embodiments, other insulating structure may be used to replace the insulators 152, 154 to electrically isolate the upper electrode 130, the conductor 160 and the second signal line 172 connected to each other, and the lower electrode 140.

As shown in FIG. 1, the rotation control unit 180 is configured to control rotation of the columnar body 110. Specifically, the rotation control unit 180 is configured to control rotation angle of the columnar body 110, and thus to control display color of the sub-pixel structure 100. In some embodiments, as shown in FIGS. 1 and 2, the rotation control unit 180 includes a shaft 182 and a first signal line 184. The shaft 182 is disposed in the columnar body 110, and the first signal line 184 electrically connects the shaft 182 to control the rotation angle of the columnar body 110. In some embodiments, the shaft 182 is through the columnar body 110.

As shown in FIG. 2, in some embodiments, the sub-pixel structure 100 further includes a reflective coating layer 190 disposed over the other 110b of the at least two portions 110a, 110b of the columnar body 110. In some embodiments, the reflective coating layer 190 includes resin material or other suitable material. In some embodiments, color of the reflective coating layer 190 is red, green, blue, white, cyan, magenta, yellow or black. In some embodiments, the color of the reflective coating layer 190 is different from the colors of the two color particles 122, 124.

In other embodiments, there is no reflective coating layer over the other 110b of the at least two portions 110a, 110b of the columnar body 110 of the sub-pixel structure 100 to direct expose an upper surface of the portion 110b of the columnar body 110. In some embodiments, the portion 110b of the columnar body 110 is white, black or another color.

As mentioned above, the sub-pixel structure 100 shown in FIG. 2 can display three colors. The display color of the sub-pixel structure 100 is controlled by controlling the rotation angle of the columnar body 110.

Figure 3:
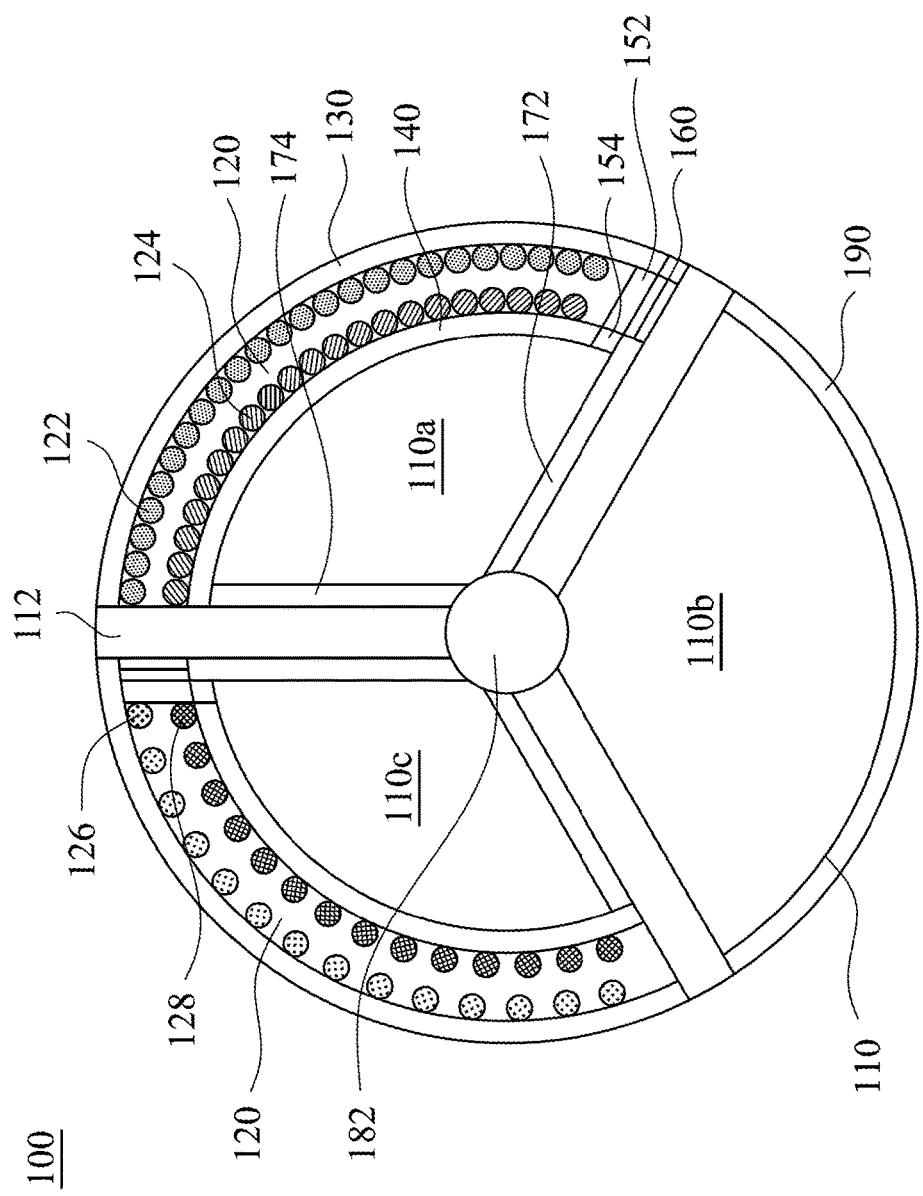
FIG. 3 is a cross-sectional view of a reflective color electrophoresis display device according to some embodiments of the present disclosure.

FIG. 3 is a cross-sectional view of a reflective color electrophoresis display device according to some embodiments of the present disclosure. The difference between FIG. 3 and FIG. 2 is that the columnar body 110 of FIG. 3 includes three spacers 112 to divide the columnar body 110 into three portions 110a, 110b, and 110c. Embodiments of structures over the portions 110a, 110b of the columnar body 110 may be referring to the embodiments of the structures over the portions 110a, 110b of the columnar body 110 of FIG. 2, and thus is not repeated herein.

Embodiments of a structure over the portion 110c of the columnar body 110 may be referring to the embodiments of the structure over the portion 110a of the columnar body 110 of FIG. 2. It is noted that there is an electronic ink layer 120 disposed over the portion 110c of the columnar body 110, which includes two different color particles 126, 128. In some embodiments, colors of the color particles 126, 128 are different from those of the color particles 122, 124. As such, the sub-pixel structure 100 shown in FIG. 3 can display five colors. The display color of the sub-pixel structure 100 is controlled by controlling the rotation angle of the columnar body 110.

It can be understood that in other embodiments, the columnar body can also be divided into four portions or more, and the electronic ink layer and the electrodes, or the reflective coating layer, can be selectively disposed over each portion, so that the sub-pixel structure can display more colors.

Figure 4:
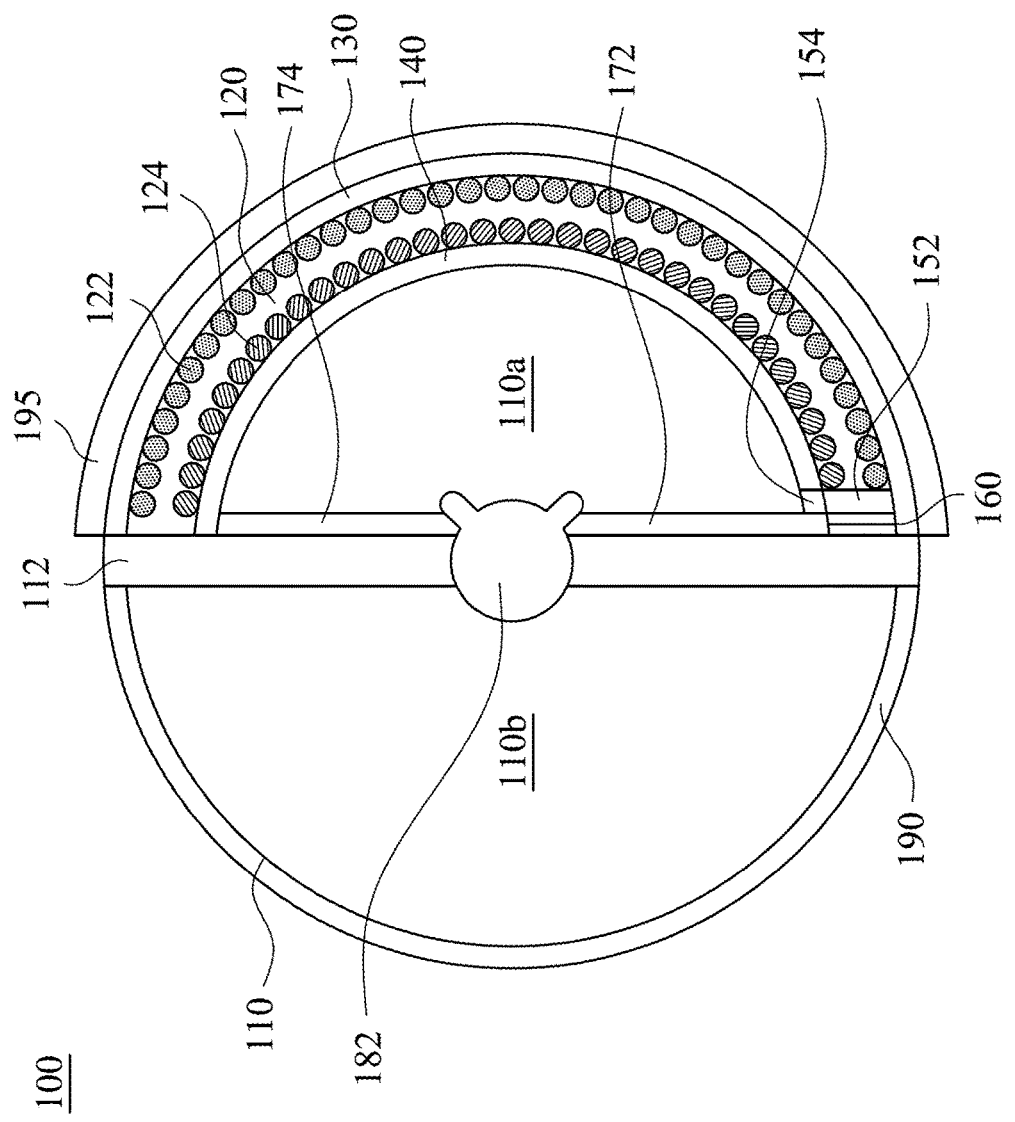
FIG. 4 is a cross-sectional view of a reflective color electrophoresis display device according to some embodiments of the present disclosure.

FIG. 4 is a cross-sectional view of a reflective color electrophoresis display device according to some embodiments of the present disclosure. In some embodiments, as shown in FIG. 4, the color particles 122, 124 of the electronic ink layer 120 are black and white, respectively. In some embodiments, the sub-pixel structure further includes a color filter 195 over the upper electrode 130. In some embodiments, the color filter 195 includes color photoresists, such as red, green, blue, cyan, magenta and yellow photoresists. In some embodiments, the color filter 195 includes red, green and blue photoresists. In some embodiments, the color filter 195 includes cyan, magenta and yellow photoresists. In other embodiments, color filters (not shown) may be disposed over the two upper electrodes 130 of FIG. 3, respectively.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A reflective color electrophoresis display device, comprising:
a plurality of sub-pixel structures, and each of the sub-pixel structures comprising:
a columnar body comprising at least one spacer radially disposed to divide the columnar body into at least two portions;
an electronic ink layer disposed over one of the at least two portions of the columnar body, and the electronic ink layer containing two different color particles;
two electrodes electrically connecting the electronic ink layer to control movement of the two different color particles; and
a rotation control unit configured to control rotation of the columnar body.

2. The reflective color electrophoresis display device of claim 1, wherein the two electrodes are an upper electrode and a lower electrode, and the upper electrode is in contact with an upper surface of the electronic ink layer, and the lower electrode is in contact with a lower surface of the electronic ink layer and between the electronic ink layer and the one of the at least two portions of the columnar body.

3. The reflective color electrophoresis display device of claim 1, wherein the sub-pixel structure further comprises:
an insulating layer adjacent to the electronic ink layer.

4. The reflective color electrophoresis display device of claim 1, wherein the rotation control unit comprises:
a shaft disposed in the columnar body; and
a first signal line electrically connecting the shaft to control the rotation of the columnar body.

5. The reflective color electrophoresis display device of claim 1, wherein the sub-pixel structure further comprises:
a second signal line and a third signal line electrically connecting the two electrodes, respectively.

6. The reflective color electrophoresis display device of claim 5, wherein one of the second signal line and the third signal line is disposed over the spacer.

7. The reflective color electrophoresis display device of claim 1, wherein the sub-pixel structure has a diameter in a range of 5 mm to 500 mm.

8. The reflective color electrophoresis display device of claim 1, wherein the columnar body comprises three spacers to divide the columnar body into three portions.

9. The reflective color electrophoresis display device of claim 1, wherein the sub-pixel structures further comprises:
a reflective coating layer disposed over the other of the at least two portions of the columnar body.

10. The reflective color electrophoresis display device of claim 1, wherein colors of the two different color particles are selected from the group consisting of red, green, blue, white, cyan, magenta, yellow and black.

11. The reflective color electrophoresis display device of claim 2, wherein colors of the two different color particles are black and white, respectively, and the sub-pixel structure further comprises:
a color filter disposed over the upper electrode.

* * * * *